Patented Sept. 29, 1942

2,296,829

UNITED STATES PATENT OFFICE 2,296,829

MAKING ALKALI CELLULOSE OF LOW WATER CONTENT

Arthur J. Barry, Midland, Mich., assignor to The Dow Chemical Company, Midland, Mich., a corporation of Michigan No Drawing. Application March 22, 1941, Serial No. 384,704

2 Claims. (Cl. 260—233)

This invention relates to the preparation of cellulose ethers, and more particularly concerns a method for the production of uniform alkali cellulose of low water content.

Various processes have been suggested for the preparation of alkali cellulose of low water content, but one of two principal disadvantages is usually encountered when utilizing these processes; either the expense involved is prohibitively great, or the product resulting is of such non-uniform character that it is unsatisfactory for many commercial uses. As an example, the following are three methods heretofore employed in preparing low water content alkali celluloses: (1) by drying alkali cellulose in a vacuum or by distilling with gasoline, petroleum or benzol until the water content has been sufficiently reduced, (2) by impregnation of cellulose by soaking in a water or caustic alkali solution, pressing out a part of the water or alkali solution, and treating the remainder with solid caustic alkali, or (3) by treating the cellulose at the start with solid caustic alkali or with a mixture thereof and a saturated solution of caustic alkali. When employing the first process, the resulting product is usually brittle and inflexible. The second method has the disadvantage that the amount of water that can be removed from the alkali cellulose is limited. When using method (3) it is difficult to obtain a product which is homogeneous throughout. Further, none of the prior methods yield an anhydrous alkali cellulose.

Accordingly, it is an object of the present invention to provide a simple, economical process for making uniform, non-degraded alkali cellulose containing high proportions of cellulose relative to the amount of water present. Other objects and advantages will appear hereinafter.

According to the invention these objects are attained by making a uniform alkali cellulose of relatively high water content and removing water therefrom by extraction with liquid ammonia. This solvent has been found to remove water uniformly from the entire mass of alkali cellulose being treated. In addition, the extraction may be stopped at any stage short of the anhydrous state to give an alkali cellulose of predetermined water content. The extraction is preferably carried out at temperatures below about 25° C., as higher temperatures are likely to cause degradation of the cellulose.

For the purpose of making alkali cellulose for extraction, I may use any caustic soda solution which is fluid at moderate temperatures, i. e. temperatures at which there is no substantial degradation of cellulose during the dipping operation. However, it is preferred to use caustic soda solutions of from 12 to 40 per cent concentration, as it has been found that such concentrations give very uniform penetration of the cellulose fibers in a relatively short time.

The preparation of alkali cellulose using the comparatively dilute caustic soda solutions contemplated in the instant invention is well known and the prior art contains many descriptions of variations in method and apparatus. In general, cellulose in convenient form, such as sheets, for example, is immersed in caustic soda solution until it is thoroughly soaked and is then removed from the bath and excess caustic liquor removed from the so-formed alkali cellulose by suitable means, such as by squeezing between rolls, or in a press.

Extraction with liquid ammonia according to the invention is carried out at room temperature or below, but it is preferred to work below the boiling point of liquid ammonia (—33° C.). as the necessity for pressure equipment is thereby avoided. Temperatures as low as —80° C. may be used. The extraction may be performed either by adding successive quantities of liquid ammonia to the alkali cellulose and decanting them in turn, or the alkali cellulose may be continuously extracted by a single quantity of liquid ammonia using the Soxhlet principle.

The following examples are illustrative of the invention, but are not to be construed as limiting the scope thereof.

Example 1

10 parts by weight of cellulose were steeped for 2¼ hours at 18° C. in an excess of 31 per cent caustic soda solution, then pressed to 31.6 parts by weight. The product contained 31.1 parts of cellulose, 25.2 parts of caustic soda, and 43.7 parts by weight of water. After extraction by decantation, as above described, with liquid ammonia at —80° C. for 48 hours, followed by evaporation of residual ammonia at room temperature, an alkali cellulose was obtained having the following composition:

| | Parts by weight |
|---|---|
| Cellulose | 54.9 |
| Caustic soda | 41.5 |
| Water | 0.0 |
| Ammonia | 3.6 |

Example 2

10.7 parts of cellulose were steeped for 2 hours at 10°–25° C. in an excess of 36 per cent caustic soda solution, then pressed to 33.5 parts by weight. This pressed product contained 28.6 per cent of cellulose, 31.3 per cent of caustic soda, and 40.1 per cent of water. This mixture was then continuously extracted with anhydrous ammonia at −33° C. for 5 hours in a modified Soxhlet apparatus. After the drained product had come to room temperature it had the following composition:

| | |
|---|---|
| Cellulose | 49.0 |
| Caustic soda | 48.7 |
| Water | 1.1 |
| Ammonia | 1.2 |

The alkali celluloses made as described above were both light colored products. On alkylation with alkyl halides according to standard practice, alkyl celluloses of uniform solubility properties were obtained with a minimum alkyl alcohol and similar by-product formation.

Alkali cellulose prepared according to the invention, as may be seen from the foregoing examples, is substantially free from water, and in addition, has been found to be much more homogeneous and uniform in character than alkali celluloses prepared in accordance with prior art practices. The examples have illustrated the treatment of alkali celluloses made from caustic soda solutions of 31 and 36 per cent concentrations. It is applicable as well to treatment of alkali cellulose made from any caustic soda which is fluid at moderate temperatures. The examples describe the use of extraction temperatures of −80° and −33° C. It is to be understood that other temperatures up to about +25° C. or higher, may be employed in suitable pressure equipment. The extraction need not be carried to the anhydrous state but may, if desired, be terminated when the water content of the alkali cellulose has been reduced, for example, to that normally occurring in alkali cellulose made from 75 per cent caustic soda, without the degradation usually accompanying the use of such strong solutions at the temperatures necessary to keep them liquid. The method of the present invention may also, of course, be used in the dehydration of any alkali cellulose to produce a uniform alkali cellulose of low water content relative to that producible directly from cellulose and alkali solution.

I claim:

1. The method which includes treating with liquid ammonia an alkali cellulose containing water and separating from the alkali cellulose liquid ammonia and water in admixture.

2. The method which includes treating with liquid ammonia an alkali cellulose containing water, at a temperature between −80° and +25° C., and separating a fraction comprising an alkali cellulose of lowered water content and a fraction comprising liquid ammonia and water.

ARTHUR J. BARRY.